US012768986B2

(12) United States Patent
Jumonji et al.

(10) Patent No.: US 12,768,986 B2
(45) Date of Patent: Oct. 20, 2026

(54) INFORMATION PROVISION DEVICE, INFORMATION PROVISION METHOD, RECORDING MEDIUM, AND OBSERVATION SYSTEM

(71) Applicant: NEC Corporation, Tokyo (JP)

(72) Inventors: Nana Jumonji, Tokyo (JP); Takakazu Ishii, Tokyo (JP); Hiromichi Hirata, Tokyo (JP); Shouhei Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 255 days.

(21) Appl. No.: 18/688,820

(22) PCT Filed: Sep. 21, 2021

(86) PCT No.: PCT/JP2021/034496
§ 371 (c)(1),
(2) Date: Mar. 4, 2024

(87) PCT Pub. No.: WO2023/047442
PCT Pub. Date: Mar. 30, 2023

(65) Prior Publication Data
US 2024/0402333 A1 Dec. 5, 2024

(51) Int. Cl.
*G01B 15/00* (2006.01)
*G01S 13/90* (2006.01)

(52) U.S. Cl.
CPC .......... *G01S 13/9021* (2019.05); *G01B 15/00* (2013.01)

(58) Field of Classification Search
CPC ............................ G01S 13/9021; G01B 15/00
See application file for complete search history.

(56) References Cited

U.S. PATENT DOCUMENTS 6,583,751 B1 6/2003 Ferretti et al.
2020/0166626 A1* 5/2020 Toriya .................. G01S 13/426
2021/0003698 A1* 1/2021 Toriya .................... G06V 20/13
2024/0280689 A1* 8/2024 Tanaka .................... G01S 13/89

FOREIGN PATENT DOCUMENTS

CN 115523840 A * 12/2022 ............... G01B 7/30
JP H09-189762 A 7/1997
JP H11-008193 A 1/1999
JP 2003-228717 A 8/2003
JP 2010-236249 A 10/2010
JP 2013-253376 A 12/2013
(Continued)

OTHER PUBLICATIONS

English Translation of WO2016006283A1, 12 pages (Year: 2015).*
(Continued)

*Primary Examiner* — Bernarr E Gregory
*Assistant Examiner* — Isabella Ameyali Edrada

(57) ABSTRACT

This information provision device provides a user of observation data obtained by synthetic aperture radar (SAR) with information regarding the tilt of a building. A detection unit (12) acquires measurement data of the amount of displacement of a building measured on the basis of observation data obtained by SAR, and detects the tilt of the building due to unequal settlement on the basis of the amount of displacement of the building. A display unit (13) displays, on map data, the location of the building for which the tilt has been detected.

20 Claims, 13 Drawing Sheets

(56) References Cited

FOREIGN PATENT DOCUMENTS

| | | | | | |
|---|---|---|---|---|---|
| JP | 2015-215210 | A | | 12/2015 | |
| JP | 2017-003399 | A | | 1/2017 | |
| JP | 2017-215248 | A | | 12/2017 | |
| JP | 2021-140704 | A | | 9/2021 | |
| WO | 2016/006283 | | | 1/2016 | |
| WO | WO-2016006283 | A1 | * | 1/2016 | ............. G06Q 50/26 |

OTHER PUBLICATIONS

English Translation of CN115523840A (Year: 2021).*
JP Official Communication for JP Application No. 2023-549176, mailed on Jun. 19, 2025 with English Translation.
JP Office Communication for JP Application No. 2023-549176, mailed on Mar. 11, 2025 with English Translation.
International Search Report for PCT Application No. PCT/JP2021/034496, mailed on Nov. 30, 2021.
English translation of Written opinion for PCT Application No. PCT/JP2021/034496, mailed on Nov. 30, 2021.
JP Office Action for JP Application No. 2023-549176, mailed on Nov. 12, 2024 with English Translation.

* cited by examiner

INFORMATION PROVISION DEVICE, INFORMATION PROVISION METHOD, RECORDING MEDIUM, AND OBSERVATION SYSTEM

This application is a National Stage Entry of PCT/JP2021/034496 filed on Sep. 21, 2021, the contents of all of which are incorporated herein by reference, in their entirety.

TECHNICAL FIELD

The present invention relates to an information provision device, an information provision method, a recording medium, and an observation system, and, for example, relates to an information provision device, an information provision method, a recording medium, and an observation system for providing map information based on data observed by SAR.

BACKGROUND ART

Synthetic aperture radar (SAR) is mounted on an aircraft or an artificial satellite, and emits microwaves toward the earth's surface and receives reflected waves from the earth's surface, thereby observing a distance from the earth's surface to the SAR-equipped machine. According to a technique called interferometric SAR (InSAR), it is possible to measure a displacement (such as uplift or settling) of the earth's surface in the vertical direction with an accuracy at a several-centimeter level from data observed twice by the SAR (e.g., PTL 1). In addition, in recent years, there is also a technology for measuring a displacement of the earth's surface with a millimeter-level accuracy from observation data obtained through a larger number of periods (about 20 or more times) (e.g., PTL 2). Here, the earth's surface includes not only the ground but also an artificial object such as a pavement or a building. The data observed by the SAR is widely used in various industries, not limited to people who research national policies and geology/earth science. For example, an interferometric SAR image in which a displacement amount of the earth's surface in a region observed by the SAR is expressed (data visualization) by a color element (hue or brightness) is often used to investigate a situation of ground settlement and to monitor a ground deformation resulting from an earthquake. In addition, the data observed by the SAR may be used for planning the construction and repair of infrastructure buildings.

CITATION LIST

Patent Literature

PTL 1: JP 2017-215248 A
PTL 2: JP 2003-228717 A
PTL 3: JP 09-189762 A
PTL 4: U.S. Pat. No. 6,583,751 B1

SUMMARY OF INVENTION

Technical Problem

The displacement of the building includes the settling of the building in the vertical direction together with the ground under the foundation while maintaining the horizontal, and the tilt of the building while the settling of the building is unequal (that is, unequal settling). In the related art, only measurement data on the displacement amount of the building is provided, and thus it is difficult for a person who uses data observed by the SAR to determine whether the building is tilted.

The present invention has been made in view of the aforementioned problem, and an object of the present invention is to provide information regarding a tilt of a building to a user who uses data observed by SAR.

Solution to Problem

An information provision device according to an aspect of the present invention includes a detection means that acquires measurement data on a displacement amount of a building measured based on data observed by SAR, and detects a tilt due to unequal settling of the building based on the displacement amount of the building, and a display means that displays a position of the building of which the tilt has been detected on map data.

An information provision method according to an aspect of the present invention includes acquiring measurement data on a displacement amount of a building measured based on data observed by SAR, and detecting a tilt due to unequal settling of the building based on the displacement amount of the building, and displaying a position of the building of which the tilt has been detected on map data.

A recording medium according to an aspect of the present invention stores a program for causing a computer to execute acquiring measurement data on a displacement amount of a building measured based on data observed by SAR, and detecting a tilt due to unequal settling of the building based on the displacement amount of the building, and displaying a position of the building of which the tilt has been detected on map data.

An observation system according to an aspect of the present invention includes the information provision device, a database that stores the data observed by the SAR, and a display on which a symbol indicating the classification of the building, the symbol being linked to the measurement data on the displacement amount of the building, is displayed together with the map data.

Advantageous Effects of Invention

According to an aspect of the present invention, it is possible to provide information regarding a tilt of a building to a person who uses data observed by the SAR.

EXAMPLE EMBODIMENT

Some example embodiments will be described with reference to the drawings.

(Observation System 1)

First, an example of a configuration of an observation system 1 including any of information provision devices 10, 20, 30, and 40 according to first to fourth example embodiments to be described later will be described.

Figure 1:
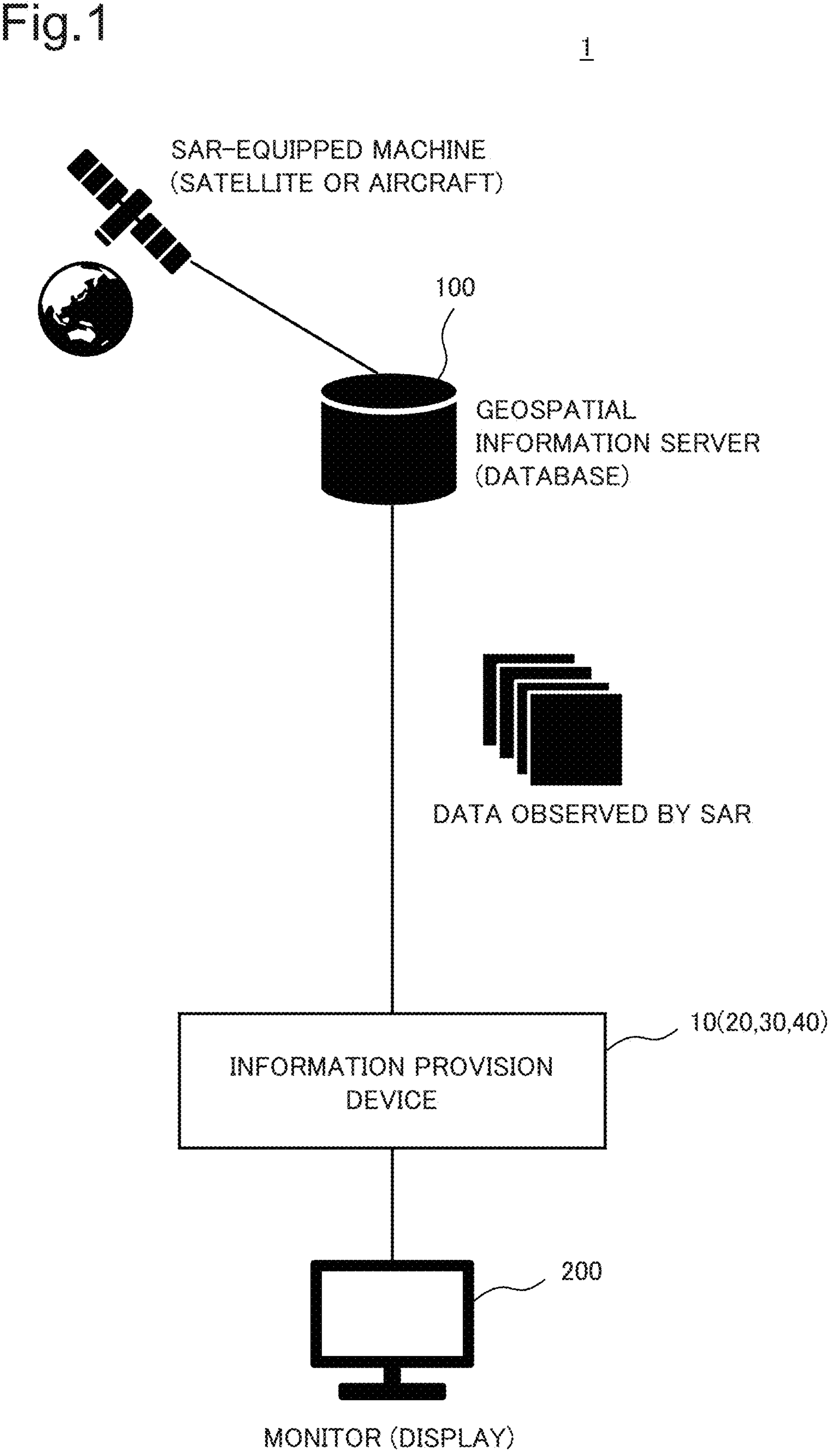
FIG. 1 is a diagram schematically illustrating an example of a configuration of an observation system to which an information provision device according to any one of first to fourth example embodiments is applicable.

FIG. 1 is a diagram schematically illustrating an example of a configuration of an observation system 1. Any of the information provision devices 10, 20, 30, and 40 according to the first to fourth example embodiments to be described below can be applied to the observation system 1.

As illustrated in FIG. 1, the observation system 1 includes an information provision device 10 (20, 30, 40), a geospatial information server 100, and a monitor 200. Here, the "information provision device (20, 30, 40)" represents any of the information provision devices 10, 20, 30, and 40 according to the first to fourth example embodiments.

The geospatial information server 100 stores data received from an SAR-equipped machine (e.g., a satellite or an aircraft). The SAR-equipped machine observes an object by irradiating the object with microwaves (radio waves) while moving in the sky, and analyzing signals of reflected waves. Here, the object is the earth's surface. The earth's surface includes not only the ground but also an artificial object such as a pavement or a building.

The data observed by the SAR includes SAR image data captured in an observed region, information for specifying a position of the earth's surface, and information indicating a distance from the SAR to the earth's surface. Further, the data observed by the SAR includes information indicating a date and time when the observation was performed.

The information provision device 10 (20, 30, 40) acquires data observed by the SAR from the geospatial information server 100. The information provision device 10 (20, 30, 40) displays a screen for providing information to the user on the display 200. Some specific examples of screens displayed on the display 200 by the information provision device 10 (20, 30, 40) will be described in the first to fourth example embodiments later.

First Example Embodiment

A first example embodiment will be described with reference to FIGS. 2 and 3.

(Information Provision Device 10)

A configuration of the information provision device 10 according to the first example embodiment will be described with reference to FIG. 2. FIG. 2 is a block diagram illustrating a configuration of the information provision device 10.

Figure 2:
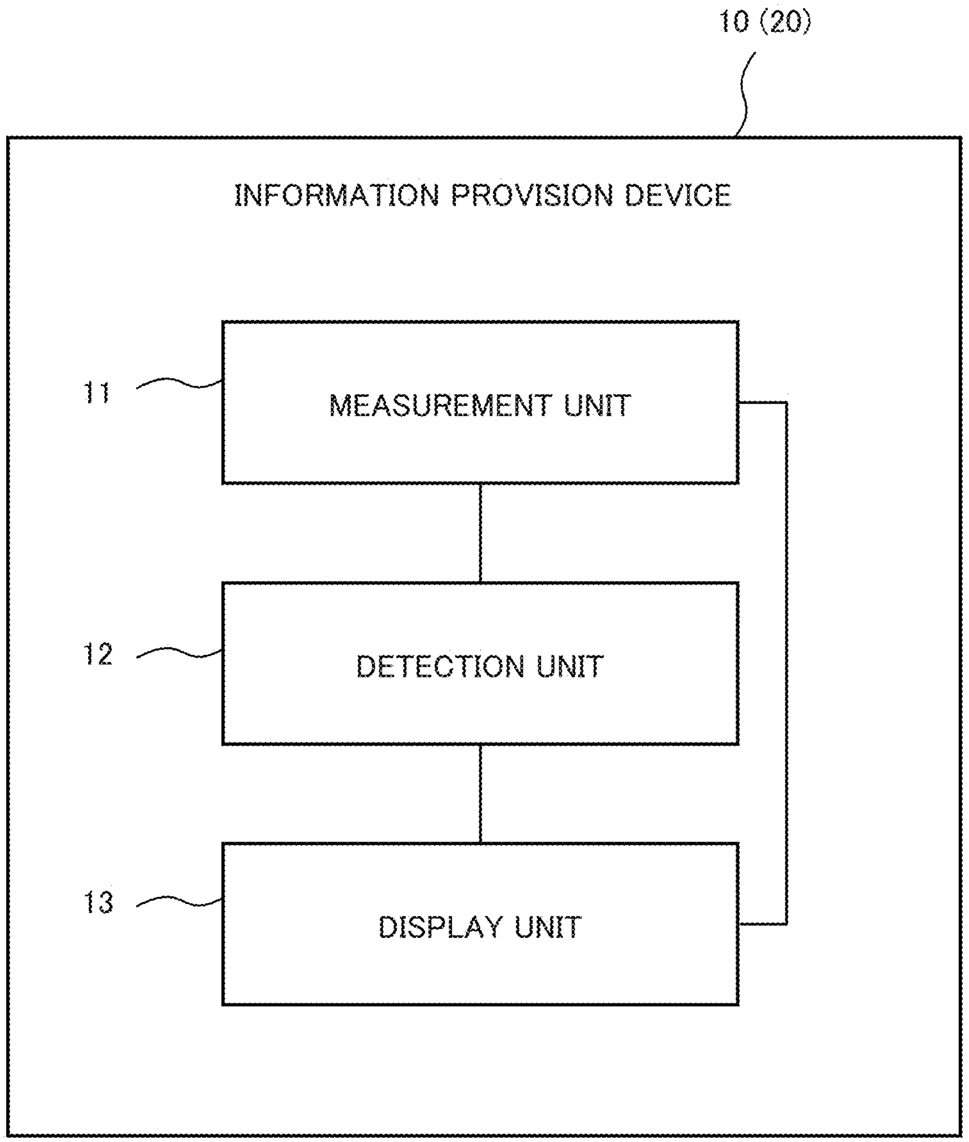
FIG. 2 is a block diagram illustrating a configuration of the information provision device according to the first example embodiment.

As illustrated in FIG. 2, the information provision device 10 includes a measurement unit 11, a detection unit 12, and a display unit 13. The measurement unit 11 measures a displacement amount of a building based on data observed by the SAR. The measurement unit 11 is an example of a measurement means.

In an example, the measurement unit 11 measures a displacement amount of a building by an interferometric SAR. The displacement amount of the building represents a magnitude of displacement (i.e., uplift or settling) of the building in a vertical direction. The interferometric SAR is also called InSAR, and is a technique for analyzing displacement and variation of the earth's surface (here, a building) in a wide range. Schematically, the displacement amount of the building is measured based on a deviation in position of the building indicated by data observed two or more times in the same region.

The measurement unit 11 outputs measurement data on the displacement amount of the building, together with the data observed by the SAR, to the detection unit 12 and the display unit 13.

The detection unit 12 detects a tilt due to unequal settling of the building based on the displacement amount of the building. The detection unit 12 is an example of a detection means.

In an example, the detection unit 12 receives the measurement data on the displacement amount of the building and the data observed by the SAR from the measurement unit 11. Using such information, the detection unit 12 detects a tilt due to unequal settling of the building.

For example, the detection unit 12 calculates a difference between a displacement amount at point A of a building and a displacement amount at point B of the same building. When difference is zero or very small (e.g., less than 3/1000 when converted into a tilt angle), it can be considered that there is no tilt in this building. On the other hand, when the difference is equal to or larger than a predetermined value (e.g., 3/1000 when converted into a tilt angle), the detection unit 12 detects a tilt due to unequal settling of the building.

The predetermined value serving as a reference used by the detection unit 12 to detect a tilt of the building may be based on, for example, human physiology. Generally, human feel bad or uncomfortable when a floor surface of a building in which the humans are located is tilted from the horizontal. Therefore, it is preferable that the predetermined value serving as a reference used by the detection unit 12 to detect a tilt of the building is small to such an extent that humans do not sense a tilt of the building. For example, the predetermined value may be within a range of 1/1000 to 6/1000 when converted into a tilt angle. Alternatively, the predetermined value serving as a reference used by the detection unit 12 to detect a tilt of the building may be a numerical value based on the Building Standards Act.

The detection unit 12 outputs information indicating a position of the building of which the tilt due to unequal settling has been detected to the display unit 13.

The display unit 13 displays the position of the building of which the tilt has been detected on map data. The display unit 13 is an example of a display means.

In an example, the display unit 13 receives the measurement data on the displacement amount of the building and the data observed by the SAR from the measurement unit 11. In addition, the display unit 13 receives, from the detection unit 12, the information indicating the position of the building of which the tilt due to unequal settling has been detected.

The display unit 13 extracts SAR image data from the data observed by the SAR. The display unit 13 displays, on the SAR image data (an example of the map data), the position of the building of which the tilt due to unequal settling has been detected. For example, the display unit 13 displays a symbol indicating the position of the building on the map data (second example embodiment).

The display unit 13 generates image data for displaying such information, and transmits the image data to the display 200 (FIG. 1). Some specific examples of the image data displayed on the display 200 by the display unit 13 will be described in the second example embodiment.

(Operation of Information Provision Device 10)

An example of an operation of the information provision device 10 according to the first example embodiment will be described with reference to FIG. 3. FIG. 3 is a flowchart illustrating an operation of the information provision device 10.

Figure 3:
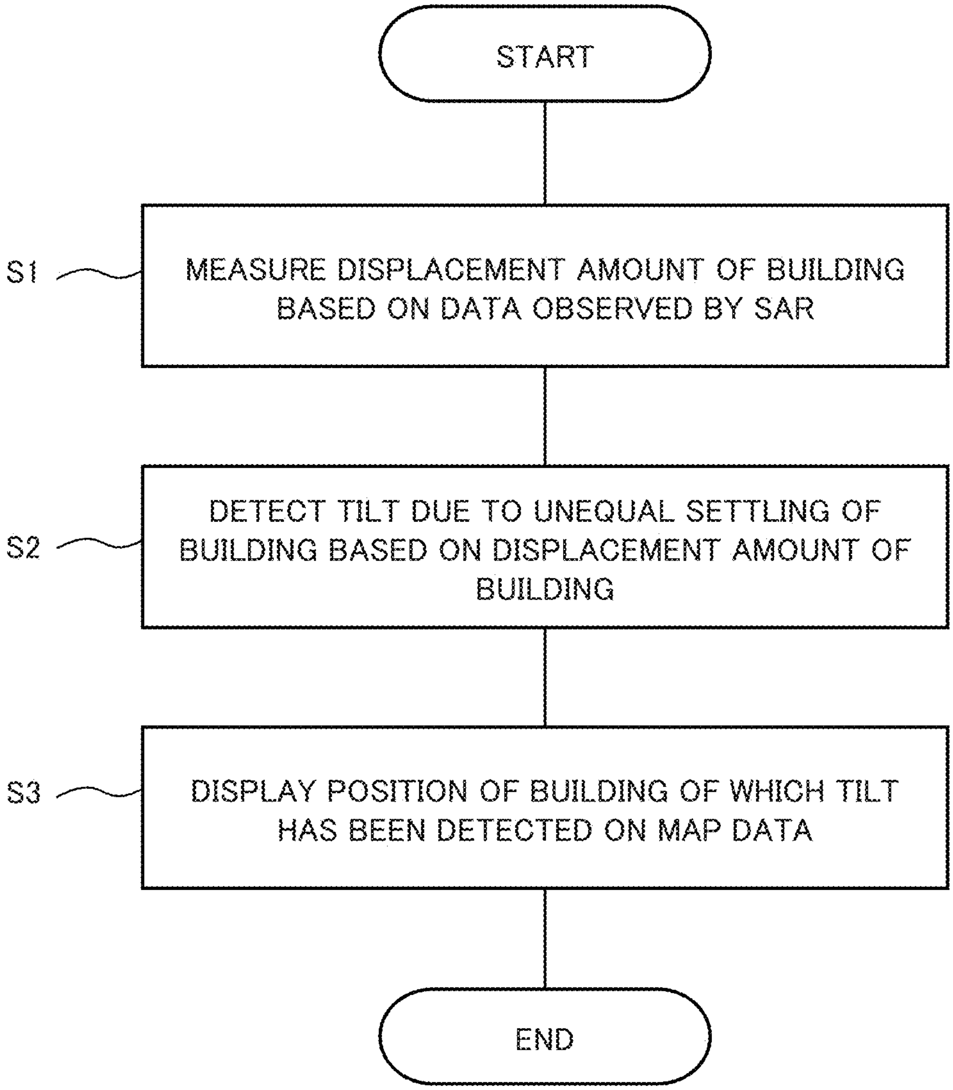
FIG. 3 is a flowchart illustrating an example of an operation of the information provision device according to the first example embodiment.

As illustrated in FIG. 3, first, the measurement unit 11 measures a displacement amount of a building based on data observed by the SAR (S1). The measurement unit 11 outputs measurement data on the displacement amount of the building, together with the data observed by the SAR, to the detection unit 12 and the display unit 13.

Next, the detection unit 12 detects a tilt due to unequal settling of the building based on the displacement amount of the building (S2). The detection unit 12 outputs information indicating a position of the building of which the tilt due to unequal settling has been detected to the display unit 13.

Lastly, the display unit 13 displays the position of the building of which the tilt has been detected on map data (S4).

Then, the operation of the information provision device 10 according to the first example embodiment ends.

Effects of Present Example Embodiment

In the configuration according to the present example embodiment, the measurement unit 11 measures a displacement amount of a building based on data observed by the SAR. The detection unit 12 detects a tilt due to unequal settling of the building based on the displacement amount of the building. The display unit 13 displays the position of the building of which the tilt has been detected on map data. Since the position of the building of which the tilt has been detected is displayed on the map data, a person using the data observed by the SAR can know where the tiled building is. In this manner, it is possible to provide information regarding a tilt of a building to a person who uses data observed by the SAR.

Second Example Embodiment

A second example embodiment will be described with reference to FIGS. 4 and 5. In the second example embodiment, a specific example of image data displayed on the display 200 (FIG. 1) by the information provision device 20 (FIG. 2) will be described. The information provision device 20 according to the second example embodiment has the same configuration as the information provision device 10 (FIG. 2) according to the first example embodiment. Therefore, in the second example embodiment, the description regarding the configuration of the information provision device 20 will be omitted by referring to the description regarding the configuration of the information provision device 10 according to the first example embodiment.

First Example: Display of Map Data/when Condition "Tilted" is not Selected

Figure 4:
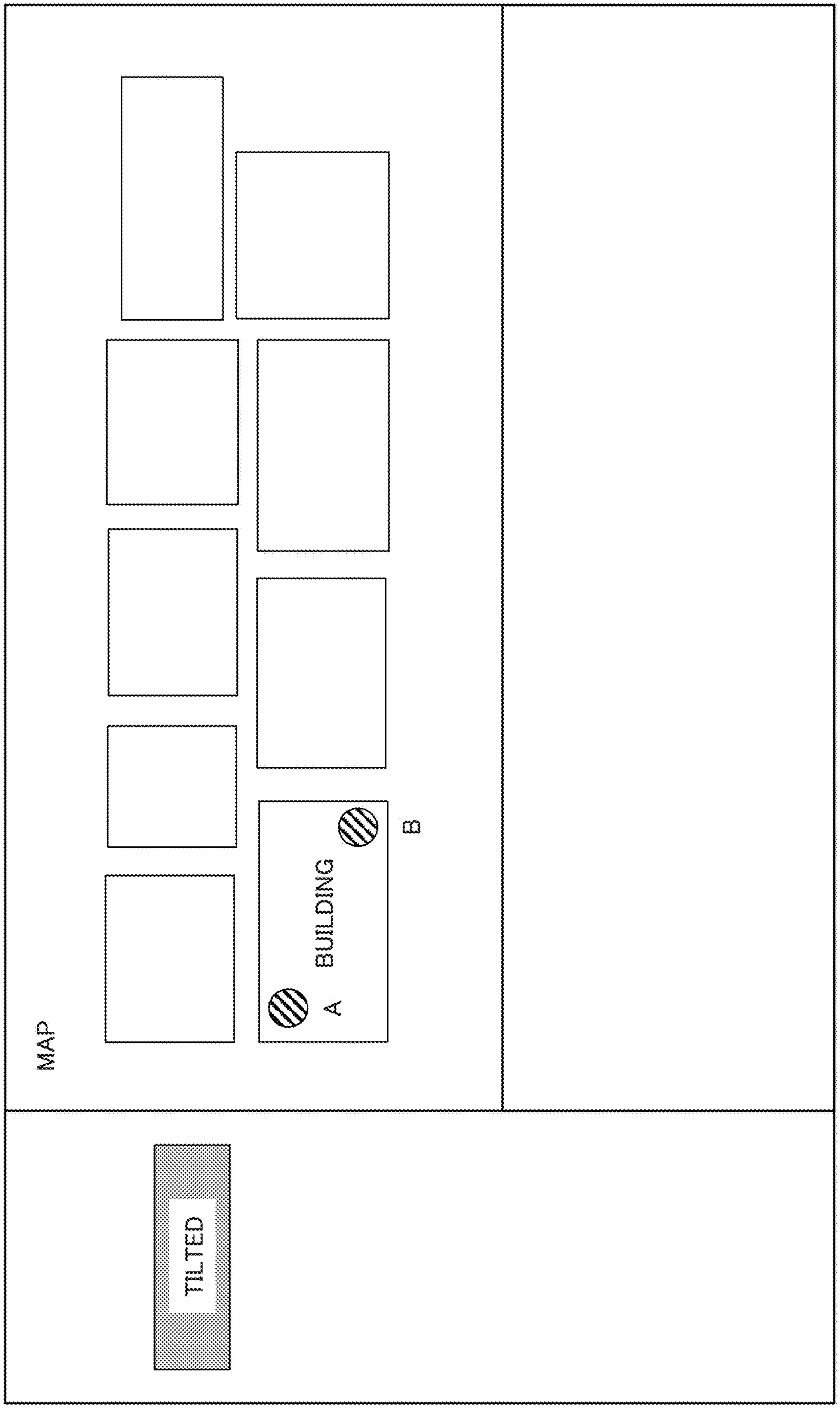
FIG. 4 is a diagram illustrating an example of a screen displayed on a display by the information provision device according to the second example embodiment.

FIG. 4 is a diagram illustrating an example of a screen displayed on the display 200 (FIG. 1) by the information provision device 20 according to the second example embodiment.

In FIG. 4, map data is illustrated on the right side. Rectangles on the map data indicate buildings. In addition, one button described as "tilted" is illustrated on the left side of FIG. 4. Turning on "tilted" is a condition for displaying a position of a building tilted due to unequal settling. In FIG. 4, the button "tilted" is not pressed. That is, since the condition is not selected, a position of a tilted building is not displayed on the map data.

As described in the first example embodiment, the detection unit 12 calculates a difference between a displacement amount at point A of a building and a displacement amount at point B of the same building. Note that the points A and B may be determined in any way, but it is preferable that the points A and B are as far apart as possible in order to accurately detect a tilt.

Second Example: Display of Position of Tilted Building/when Condition "Tilted" is Selected FIG. 5 is a diagram illustrating another example of a screen displayed on the display 200 (FIG. 1) by the information provision device 20 according to the second example embodiment.

Figure 5:
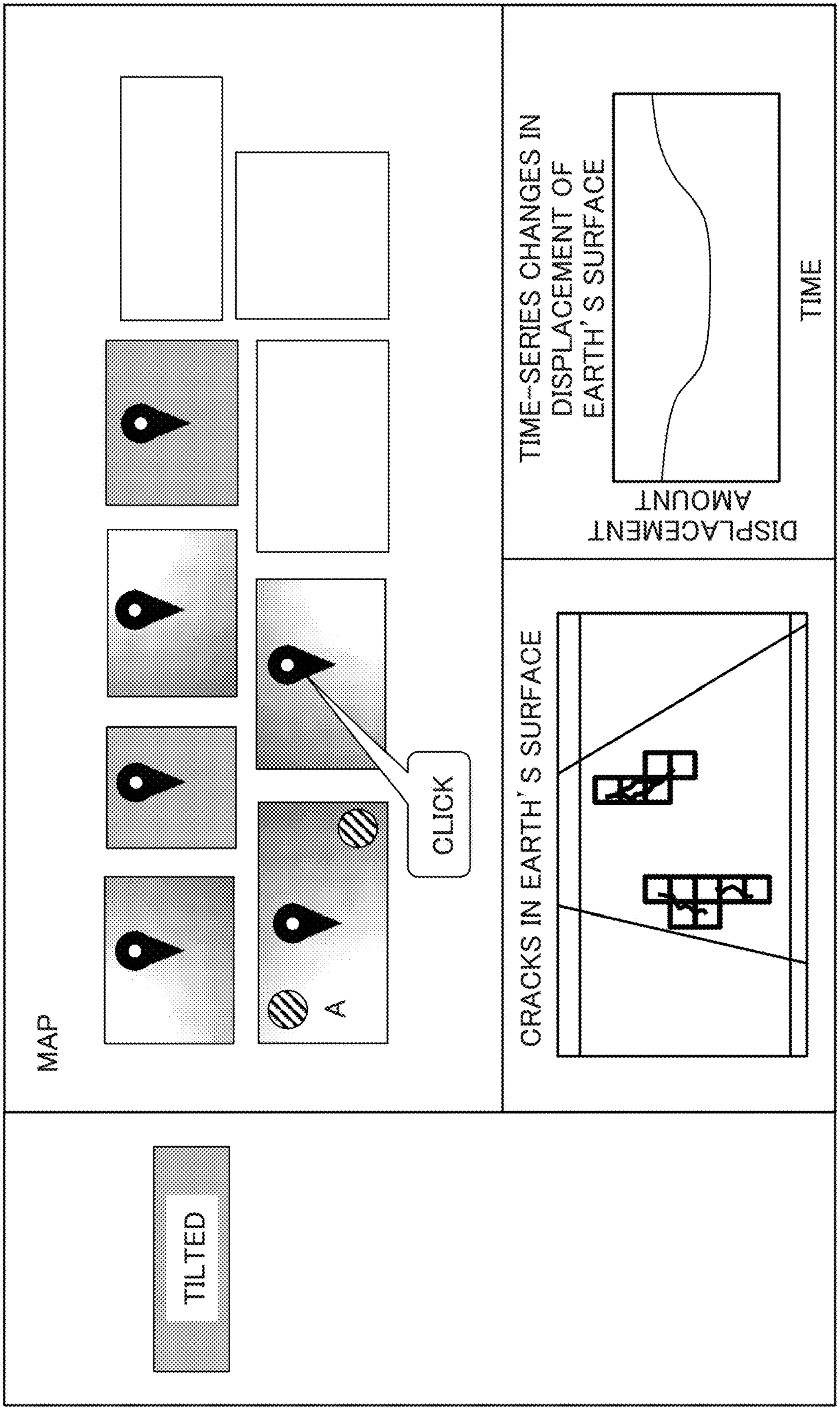
FIG. 5 is a diagram illustrating another example of a screen displayed on the display by the information provision device according to the second example embodiment.

In FIG. 5, the condition "tilted" is selected. As described with reference to FIG. 4, turning on "tilted" (that is, in a state where "tilted" is selected) is a condition for displaying a position of a building tilted due to unequal settling. As a result, in FIG. 5, a symbol indicating the position of the tilted building is displayed. The symbol may be an icon of a tilted building or an icon indicating danger. In map data illustrated in FIG. 5, since symbols are arranged at positions of six buildings, the number of tilted buildings is six in the present example.

The display unit 13 may display a symbol indicating a position of a building, the symbol being linked to the measurement data on the displacement amount of the building, together with the map data. In the first example described above, when any symbol on the map data illustrated in FIG. 4 is clicked, information regarding the earth's surface at the point indicated by the symbol (including measurement data on the displacement amount of the building) is displayed below the map data as illustrated in FIG. 5. By checking the information displayed below the map data, the user can detect the cause of the tilt of the building and determine how dangerous the tilt of the building is.

Note that, although the example in which a symbol is clicked has been described here, the type of input operation for selection is not limited.

Effects of Present Example Embodiment

In the configuration according to the present example embodiment, the measurement unit 11 measures a displacement amount of a building based on data observed by the SAR. The detection unit 12 detects a tilt due to unequal settling of the building based on the displacement amount of the building. The display unit 13 displays the position of the building of which the tilt has been detected on map data. Since the position of the building of which the tilt has been detected is displayed on the map data, a person using the data observed by the SAR can know where the tiled building is. In this manner, it is possible to provide information regarding a tilt of a building to a person who uses data observed by the SAR.

Third Example Embodiment

A third example embodiment will be described with reference to FIGS. 6 to 11. In the third example embodiment, a configuration in which buildings are classified based on tilt angles of the buildings, and displayed for each classification type or selectively displayed for one classification type will be described. In the third example embodiment, components that are the same as those in the first and second example embodiments will be denoted by the same reference signs, and the description thereof will be omitted.

(Information Provision Device 30)

Figure 6:
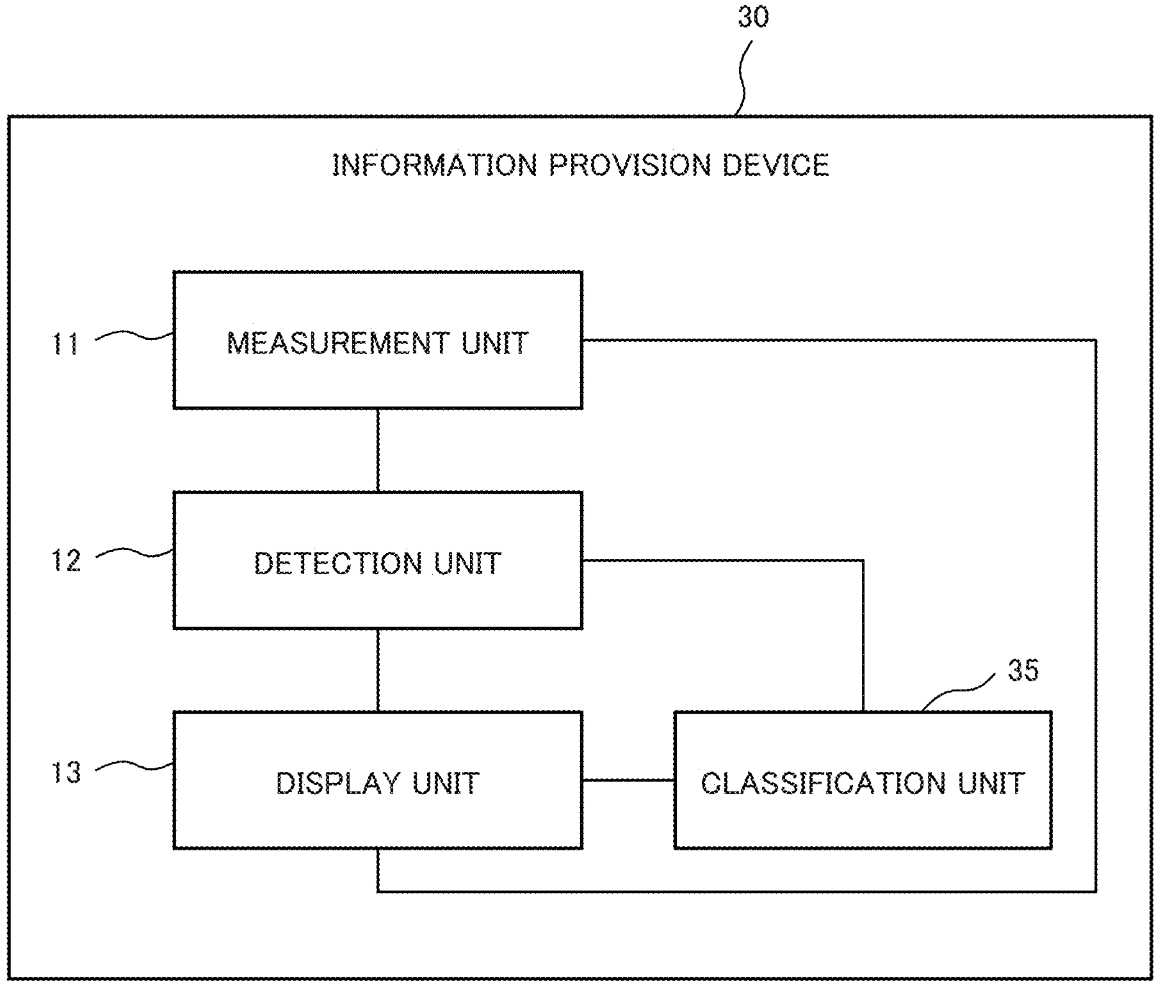
FIG. 6 is a block diagram illustrating a configuration of the information provision device according to the third example embodiment.

A configuration of the information provision device 30 according to the third example embodiment will be described with reference to FIG. 6. FIG. 6 is a block diagram illustrating a configuration of the information provision device 30.

As illustrated in FIG. 6, the information provision device 30 includes a measurement unit 11, a detection unit 12, and a display unit 13. The information provision device 30 further includes a classification unit 35.

The classification unit 35 classifies the building depending on what tilt angle the building has. The classification unit 35 is an example of a classification means.

In an example, the classification unit 35 classifies the buildings into three levels based on the tilt angles. In the first level, the tilt angle is equal to or more than 1/1000. In the second level, the tilt angle is equal to or more than 3/1000 and less than 6/1000. In the third level, the tilt angle is equal to or more than 6/1000. Further, the classification unit 35 may additionally classify a building into a zero level at which the building can be regarded as having no tilt angle (for example, when the tilt angle is less than 1/000).

The classification unit 35 outputs information indicating the classification of the buildings to the display unit 13.

Figure 8:
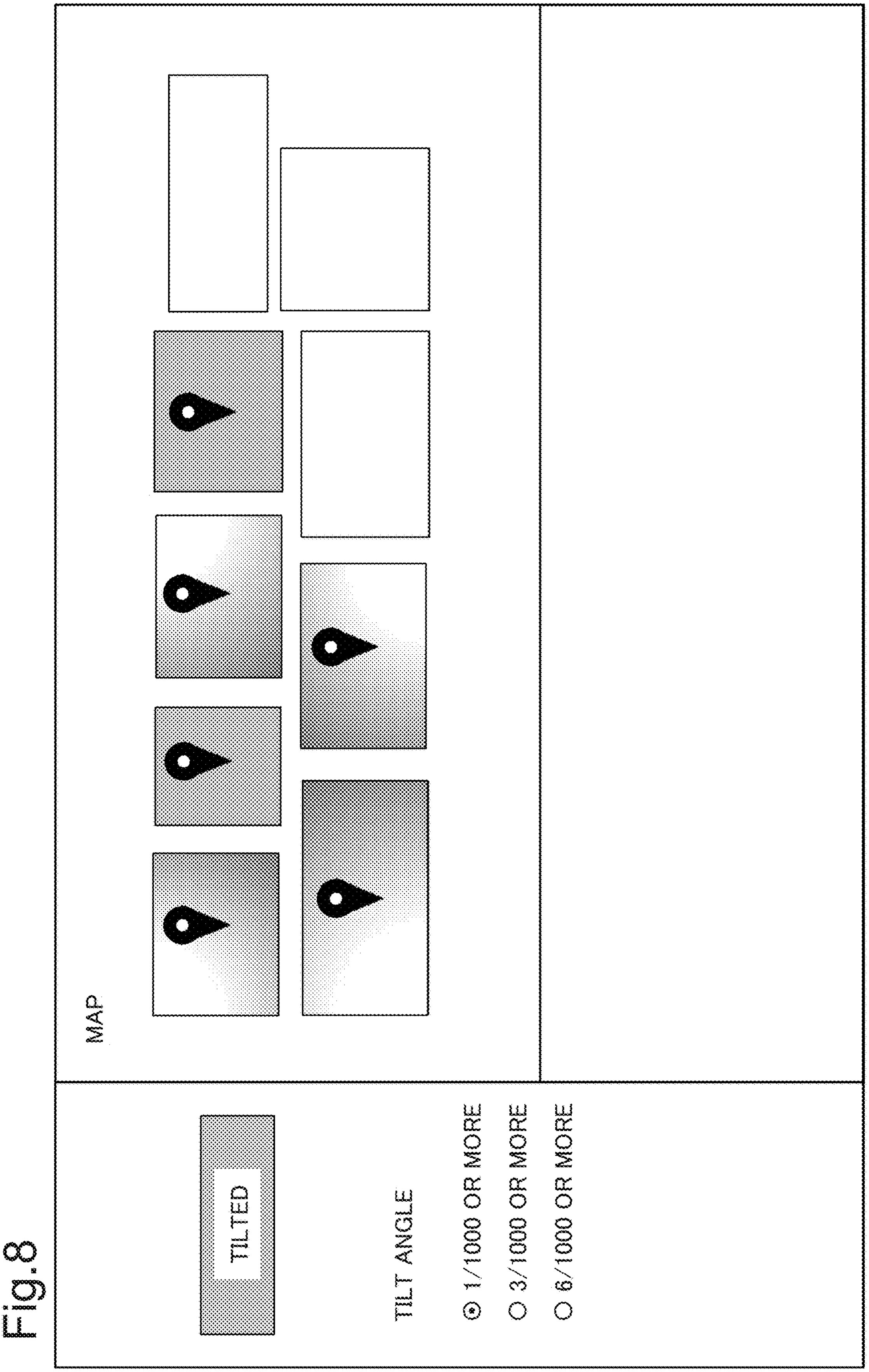
FIG. 8 is a diagram illustrating an example of a screen displayed on a display by the information provision device according to the third example embodiment.
Figure 9:
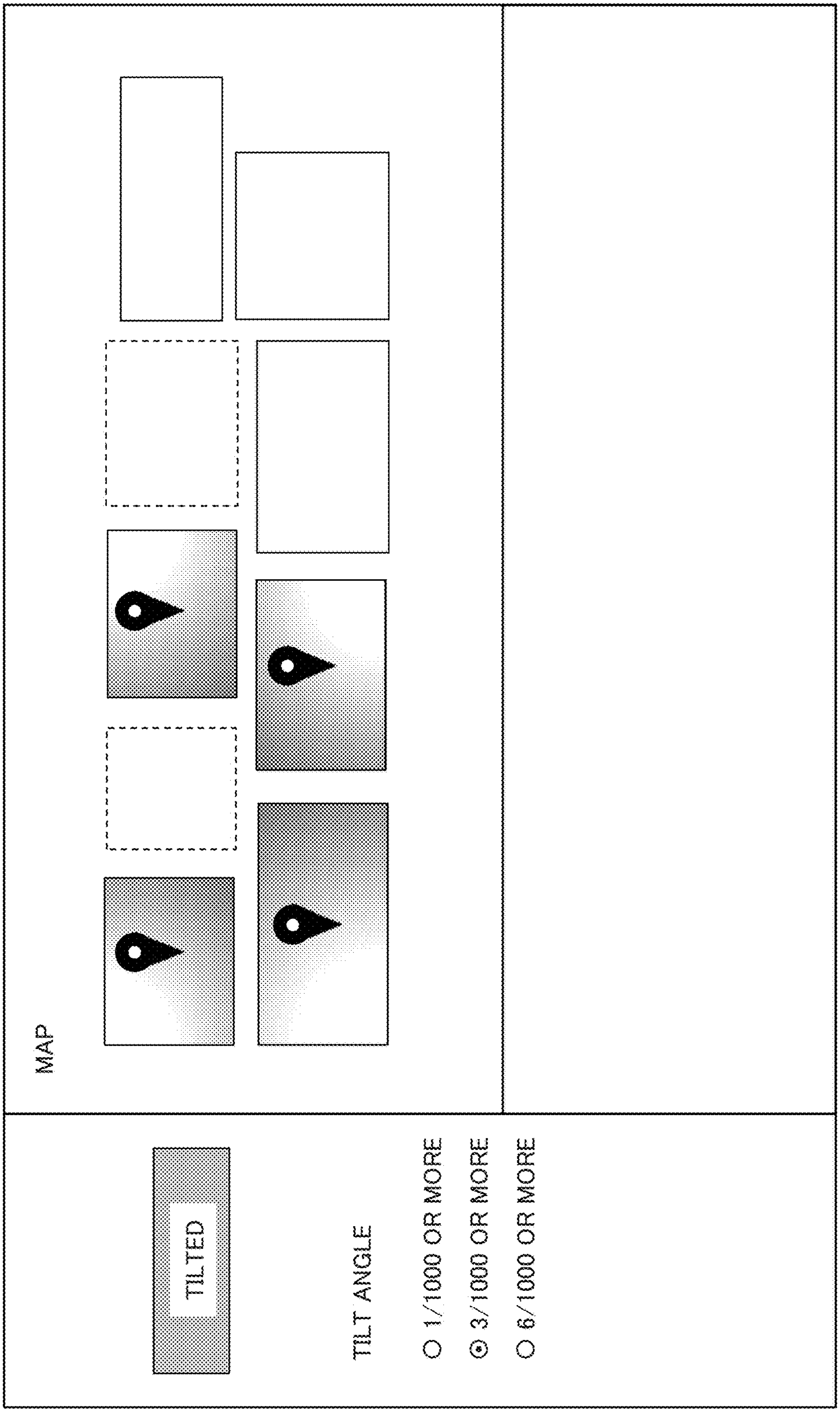
FIG. 9 is a diagram illustrating another example of a screen displayed on the display by the information provision device according to the third example embodiment.
Figure 10:
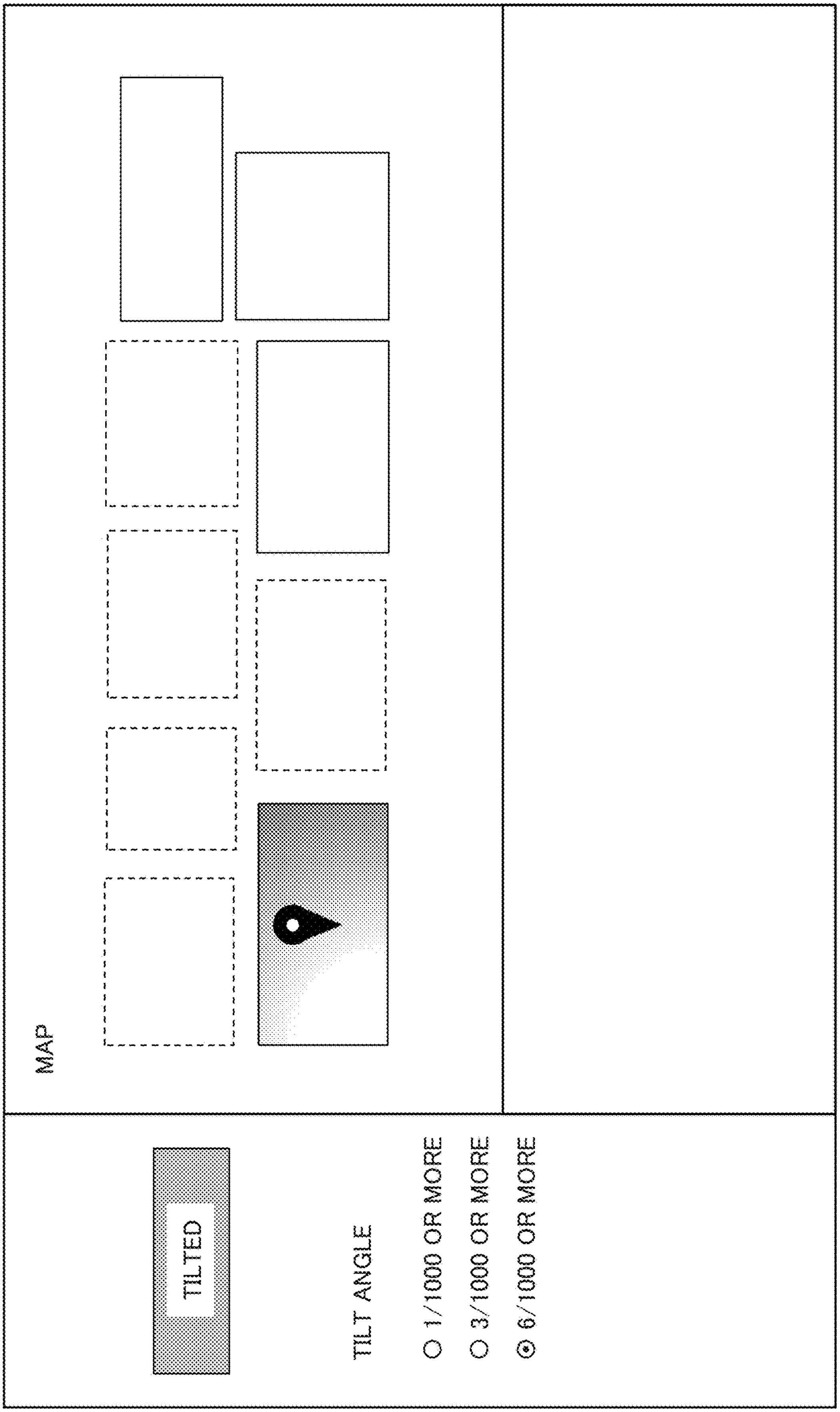
FIG. 10 is a diagram illustrating still another example of a screen displayed on the display by the information provision device according to the third example embodiment.
Figure 11:
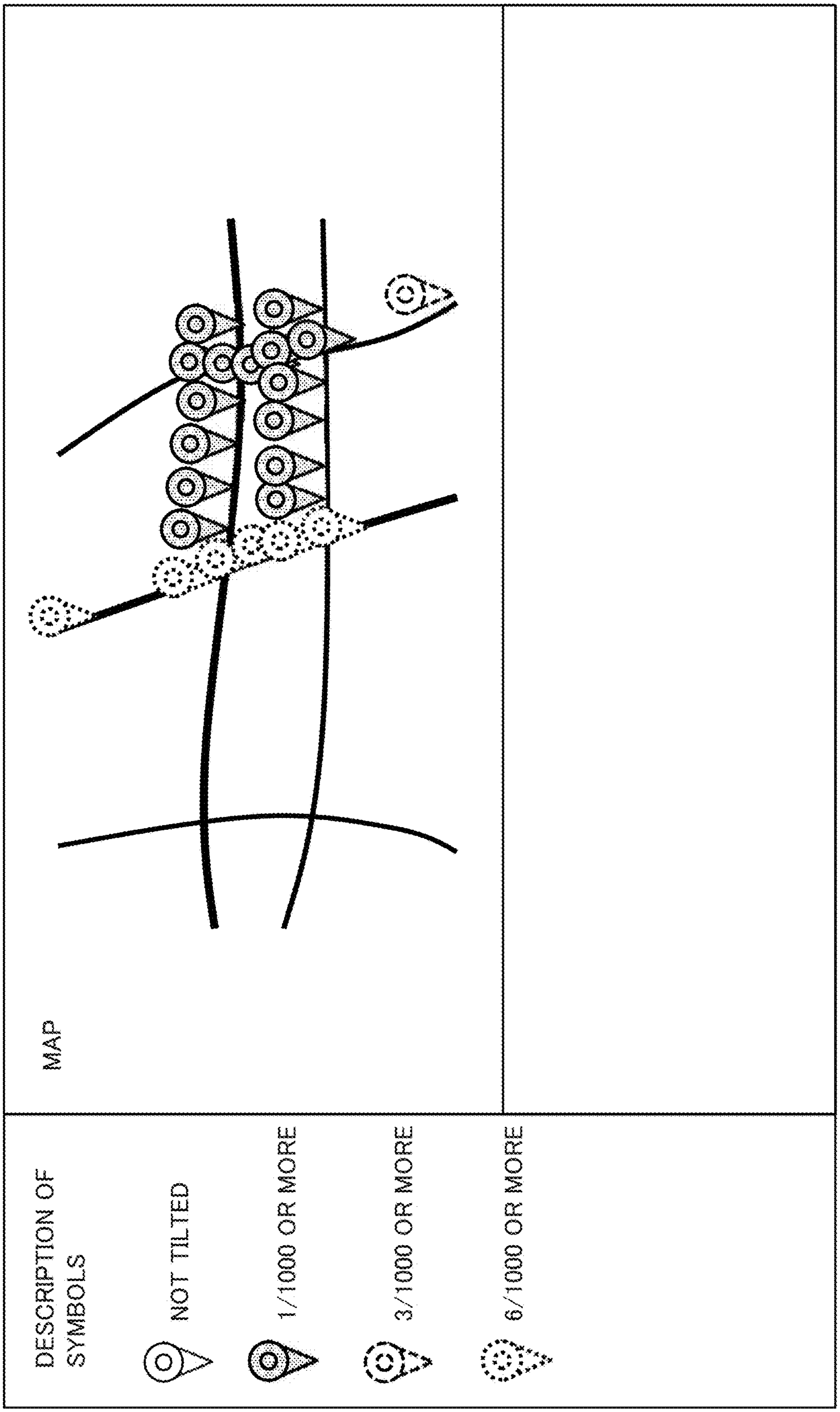
FIG. 11 is a diagram illustrating still another example of a screen displayed on the display by the information provision device according to the third example embodiment.

The display unit 13 displays the position of the building of which the tilt has been detected on map data. At this time, the display unit 13 displays the positions of the buildings in a different manner based on the information indicating the classification of the buildings received from the classification unit 35. For example, the display unit 13 displays an option button for selecting a condition regarding the classification of the buildings, and displays a position of a building having a tilt angle satisfying the selected condition together with the map data (first example: FIGS. 8 to 10). In another example, the display unit 13 displays symbols at the positions of the buildings on the map data according to the classification of the buildings (second example: FIG. 11).

(Operation of Information Provision Device 30)

Figure 7:
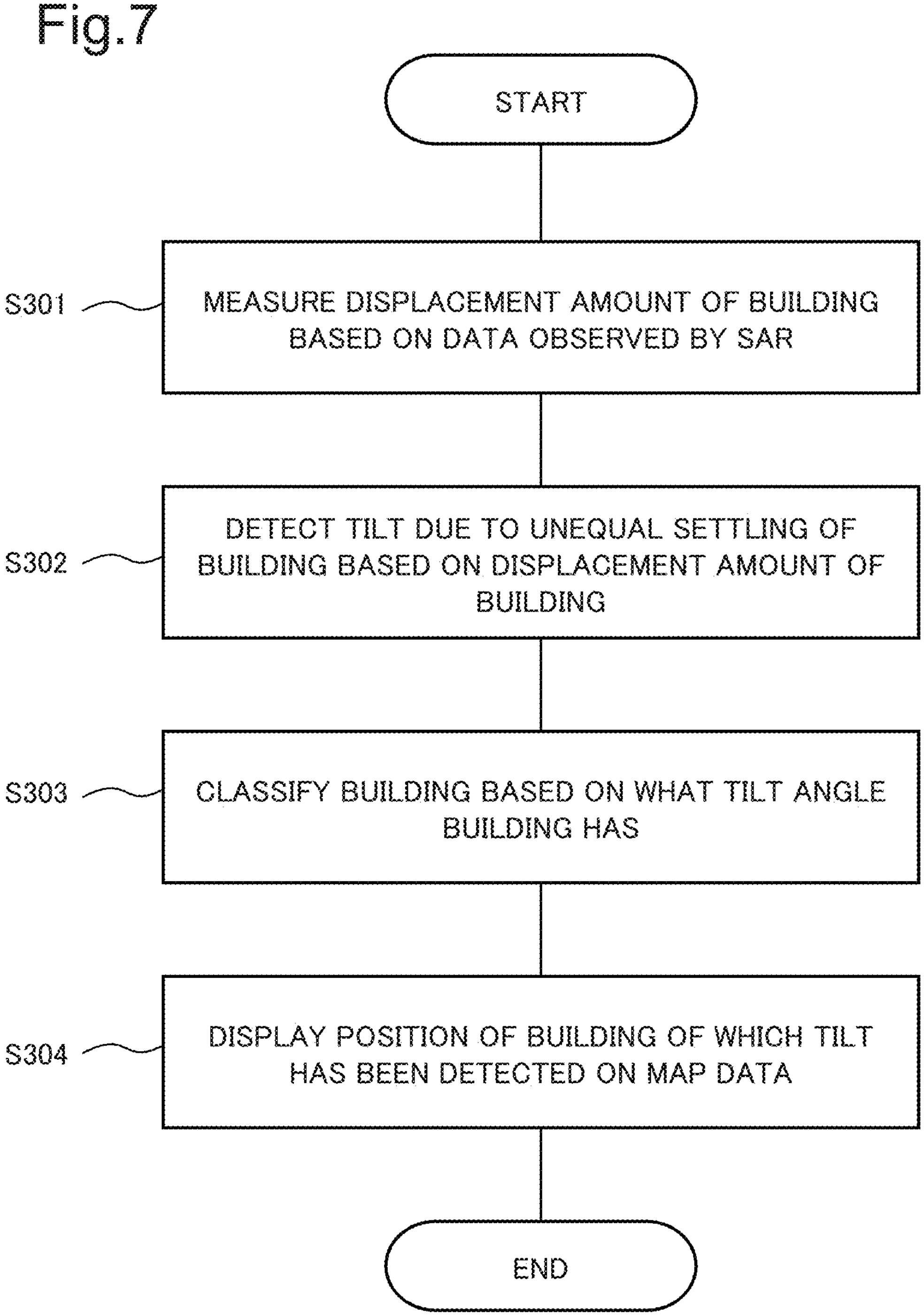
FIG. 7 is a flowchart illustrating an example of an operation of the information provision device according to the third example embodiment.

An example of an operation of the information provision device 30 according to the third example embodiment will be described with reference to FIG. 7. FIG. 7 is a flowchart illustrating an operation of the information provision device 30.

As illustrated in FIG. 7, first, the measurement unit 11 measures a displacement amount of a building based on data observed by the SAR (S301). The measurement unit 11 outputs measurement data on the displacement amount of the building, together with the data observed by the SAR, to the detection unit 12 and the display unit 13.

Next, the detection unit 12 detects a tilt due to unequal settling of the building based on the displacement amount of the building (S302). The detection unit 12 outputs information indicating a position of the building of which the tilt due to unequal settling has been detected to the classification unit 35 and the display unit 13.

The classification unit 35 classifies the building depending on what tilt angle the building has (S303). For example, as in the above-described example, the classification unit 35 classifies buildings into a plurality of types based on their tilt angles. The classification unit 35 outputs information indicating the classification of the buildings to the display unit 13.

Lastly, the display unit 13 displays the position of the building of which the tilt has been detected on map data (S304). At this time, the display unit 13 displays an option button for selecting a condition regarding the classification of the buildings, and displays a position of a building having a tilt angle satisfying the selected condition together with the map data (first example: FIGS. 8 to 10). Alternatively, the display unit 13 displays symbols at the positions of the buildings on the map data according to the classification of the buildings (second example: FIG. 11).

Then, the operation of the information provision device 30 according to the third example embodiment ends.

First Example; Selective Display of Symbols

In the first example, the display unit 13 selectively displays symbols indicating the positions of the buildings based on the classification of the buildings.

FIGS. 8 to 10 are diagrams each illustrating an example of a screens displayed on the display 200 (FIG. 1) by the information provision device 30 according to the third example embodiment.

In FIG. 8, on the left side, a list of conditions regarding the classification of the buildings is described. Specifically, there are three conditions regarding the classification of the buildings: "tilt angle is equal or more than 1/1000", "tilt angle is equal or more than 3/1000", and "tilt angle is equal or more than 6/1000". As described in the second example embodiment, no symbol is displayed on the map data until the button "tilted" is pressed. After the button "tilted" is pressed, a position of a building satisfying the condition regarding the classification of the building (the condition selected by the option button) is displayed on the map data.

In FIG. 8, the option button "tilt angle is equal or more than 1/1000" is selected. Accordingly, the display unit 13 displays a position of a building of which the "tilt angle is equal or more than 1/1000" on the map data.

In FIG. 9, the option button "tilt angle is equal or more than 3/1000" is selected. Accordingly, the display unit 13 displays a position of a building of which the "tilt angle is equal or more than 3/1000" on the map data.

In FIG. 10, the option button "tilt angle is equal or more than 6/1000" is selected. Accordingly, the display unit 13 displays a position of a building of which the "tilt angle is equal or more than 6/1000" on the map data.

In the present example, the lower limit value of the tilt angle is a condition regarding the classification of the buildings, but the condition regarding the classification of the buildings is not limited thereto. In another example, the condition regarding the classification of the buildings may be one or both of the upper limit value and the lower limit value of the tilt angle.

The conditions regarding the classification of the buildings are preferably defined according to the need of the user such as a construction company or a real estate company so that useful information useful can be presented to the user. For example, since the Building Standards Act and related regulations are important to a construction company, it is preferable that the conditions regarding the classification of buildings are associated with numerical values related to the Building Standards Act and related regulations. On the other hand, since complaints from residents are important to a real estate company, it is preferable that the conditions regarding the classification of buildings are associated with numerical values related to human physiology.

Second Example: Display of all Symbols

In the second example, the display unit 13 displays all symbols indicating the positions of the buildings.

FIG. 11 is a diagram illustrating another example of a screen displayed on the display 200 (FIG. 1) by the information provision device 30 according to the third example embodiment.

In FIG. 11, a list of symbols corresponding to conditions regarding the classification of buildings is illustrated on the left side. The four types of symbols correspond to four conditions: "(building is) not tilted": "(tilt angle is) equal or more than 1/1000": "(tilt angle is) equal or more than 3/1000"; and "(tilt angle is) equal or more than 6/1000". On the right side, several symbols are arranged on the map. The position indicated by each of the symbols is a position of a building. On the map map, regions observed by the SAR are simply indicated by lines.

When FIG. 11 is compared with FIGS. 8 to 10, the symbols in the second example correspond to the option buttons in the first example. That is, only positions of buildings satisfying the selected condition are displayed in the first example, whereas the positions of all the buildings are displayed using different symbols for the respective classification types of buildings in the second example.

In the configuration according to the present example, the user can see the positions of all the buildings at a glance while distinguishing how the buildings are classified (that is, what tilt angles the buildings have).

(Modification)

In a modification, the display unit 13 displays a symbol indicating a position of a building, the symbol being linked to the measurement data on the displacement amount of the building, together with the map data. For example, in the first example or the second example described above, when any symbol on the map data illustrated in FIGS. 8 to 11 is clicked, the display unit 13 displays information regarding the earth's surface at the point indicated by the symbol below the map data. By checking the information displayed below the map data, the user can detect the cause of the tilt of the building and determine how dangerous the tilt of the building is.

Note that, although the example in which a symbol is clicked has been described here, the type of input operation for selection is not limited.

In another modification, an alert may be sent to the user if there is something that the user needs to be noted regarding the classification of a certain building. For example, a condition for the alert is that a displacement amount of the building within a predetermined period exceeds a reference value for a warning. Although the method of sending the alert is not particularly limited, the display unit 13 may displays a sign such as "!" next to the description corresponding to the condition (symbol).

Effects of Present Example Embodiment

In the configuration according to the present example embodiment, the measurement unit 11 measures a displacement amount of a building based on data observed by the SAR. The detection unit 12 detects a tilt due to unequal settling of the building based on the displacement amount of the building. The display unit 13 displays the position of the building of which the tilt has been detected on map data. Since the position of the building of which the tilt has been detected is displayed on the map data, a person using the data observed by the SAR can know where the tiled building is. In this manner, it is possible to provide information regarding a tilt of a building to a person who uses data observed by the SAR.

Furthermore, in the configuration according to the present example embodiment, the classification unit 35 classifies a building depending on what tilt angle the building has. In an example, the display unit 13 displays an option button for selecting a condition regarding the classification of the buildings, and displays a position of a building having a tilt angle satisfying the selected condition together with the map data. Alternatively, the display unit 13 displays symbols at the positions of the buildings on the map data according to the classification of the buildings. As a result, only the information desired by the user can be selectively provided.

Fourth Example Embodiment

A fourth example embodiment will be described with reference to FIG. 12.

(Information Provision Device 40)

A configuration of the information provision device 40 according to the fourth example embodiment will be described with reference to FIG. 12. FIG. 12 is a block diagram illustrating a configuration of the information provision device 40.

Figure 12:
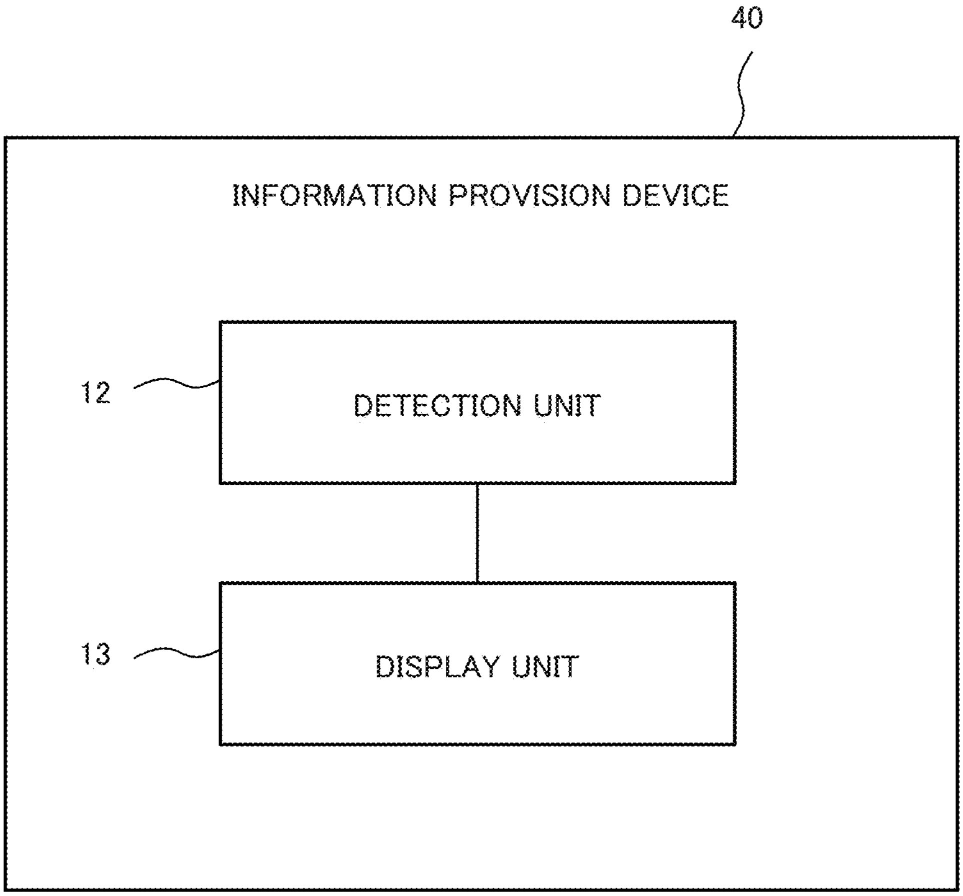
FIG. 12 is a block diagram illustrating a configuration of the information provision device according to the fourth example embodiment.

As illustrated in FIG. 12, the information provision device 10 includes a detection unit 12 and a display unit 13.

The detection unit 12 acquires data on a displacement amount of a building measured based on data observed by the SAR. The detection unit 12 is an example of a detection means. The displacement amount of the building represents a magnitude of displacement (i.e., uplift or settling) of the building in a vertical direction. The interferometric SAR is also called InSAR, and is a technique for analyzing displacement and variation of the earth's surface (here, a building) in a wide range. Schematically, the displacement amount of the building is measured based on a deviation in position of the building indicated by data observed two or more times in the same region.

The detection unit 12 outputs the measurement data on the displacement amount of the building, together with the data observed by the SAR, to the display unit 13.

In addition, the detection unit 12 detects a tilt due to unequal settling of the building based on the displacement amount of the building.

In an example, the detection unit 12 detects the tilt due to unequal settling of the building using the measurement data on the displacement amount of the building and the data observed by the SAR.

For example, the detection unit 12 calculates a difference between a displacement amount at point A of a building and a displacement amount at point B of the same building. When difference is zero or very small (e.g., less than 3/1000 when converted into a tilt angle), it can be considered that there is no tilt in this building. On the other hand, when the difference is equal to or larger than a predetermined value (e.g., 3/1000 when converted into a tilt angle), the detection unit 12 detects a tilt due to unequal settling of the building.

The predetermined value serving as a reference used by the detection unit 12 to detect a tilt of the building may be based on, for example, human physiology. Generally, human feel bad or uncomfortable when a floor surface of a building in which the humans are located is tilted from the horizontal. Therefore, it is preferable that the predetermined value serving as a reference used by the detection unit 12 to detect a tilt of the building is small to such an extent that humans do not sense a tilt of the building. For example, the predetermined value may be within a range of 1/1000 to 6/1000 when converted into a tilt angle. Alternatively, the predetermined value serving as a reference used by the detection unit 12 to detect a tilt of the building may be a numerical value based on the Building Standards Act.

The detection unit 12 outputs information indicating a position of the building of which the tilt due to unequal settling has been detected to the display unit 13.

The display unit 13 displays the position of the building of which the tilt has been detected on map data. The display unit 13 is an example of a display means.

In an example, the display unit 13 receives the measurement data on the displacement amount of the building and the data observed by the SAR from the detection unit 12. In addition, the display unit 13 receives, from the detection unit 12, the information indicating the position of the building of which the tilt due to unequal settling has been detected.

The display unit 13 extracts SAR image data from the data observed by the SAR. The display unit 13 displays, on the SAR image data (an example of the map data), the position of the building of which the tilt due to unequal settling has been detected. For example, the display unit 13 displays a symbol indicating the position of the building on the map data (second example embodiment).

The display unit 13 generates image data for displaying such information, and transmits the image data to the display 200 (FIG. 1).

(Operation of Information Provision Device 40)

The schematic operation of the information provision device 40 according to the fourth example embodiment is similar to the operation of the information provision device 10 (FIG. 2) according to the first example embodiment. However, in the information provision device 40, instead of measuring a displacement amount of a building based on data observed by the SAR, the detection unit 12 acquires data on the displacement amount of the building.

The detailed description of the operation of the information provision device 50 according to the fifth example embodiment will be omitted by referring to the description (FIG. 3) of the operation of the information provision device 10 according to the first example embodiment.

Effects of Present Example Embodiment

In the configuration according to the present example embodiment, the detection unit 12 acquires data on a displacement amount of a building based on data observed by the SAR, and detects a tilt due to unequal settling of the building based on the displacement amount of the building. The display unit 13 displays the position of the building of which the tilt has been detected on map data. Since the position of the building of which the tilt has been detected is displayed on the map data, a person using the data observed by the SAR can know where the tiled building is. In this manner, it is possible to provide information regarding a tilt of a building to a person who uses data observed by the SAR.

Regarding Hardware Configuration

Figure 13:
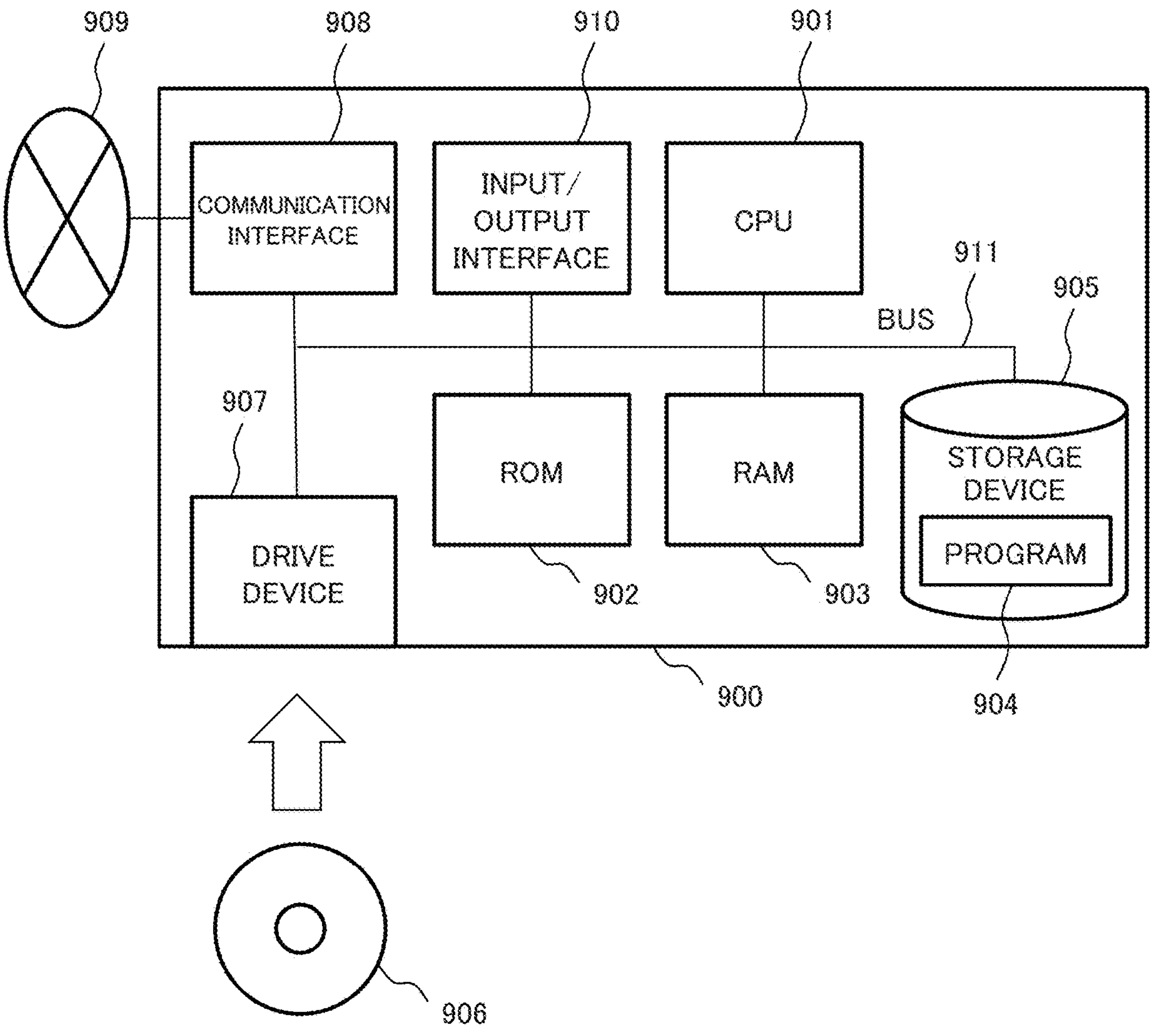
FIG. 13 is a diagram illustrating an example of a hardware configuration of the information provision device according to any one of the first to fourth example embodiments.

Each of the components of the information provision devices 10, 20, 30, and 40 described in the first to fourth example embodiments represents a block of a functional unit. Some or all of these components are achieved, for example, by an information processing apparatus 900 as illustrated in FIG. 13. FIG. 13 is a block diagram illustrating an example of a hardware configuration of the information processing apparatus 900.

As illustrated in FIG. 13, the information processing apparatus 900 includes the following components as an example.

- Central processing unit (CPU) 901
- Read only memory (ROM) 902
- Random access memory (RAM) 903
- Program 904 loaded into RAM 903
- Storage device 905 storing program 904
- Drive device 907 reading and writing recording medium 906
- Communication interface 908 connected to communication network 909
- Input/output interface 910 inputting/outputting data
- Bus 911 connecting components to each other The components of the information provision devices 10, 20, 30, and 40 described in the first to fourth example embodiments are achieved by the CPU 901 reading and executing the program 904 for achieving their functions. The program 904 for achieving the functions of the components is stored, for example, in the storage device 905 or the ROM 902 in advance, and the CPU 901 loads the program 904 into the RAM 903 for execution if necessary. Note that the program 904 may be supplied to the CPU 901 via the communication network 909, or may be stored in advance in the recording medium 906 such that the drive device 907 reads the program to be supplied to the CPU 901.

According to the above-described configuration, each of the information provision devices 10, 20, and 30 described in the first to fourth example embodiments is achieved as hardware. Therefore, effects similar to those described in any of the first to fourth example embodiments can be obtained.

(Supplementary Notes)

One aspect of the present invention is described as in the following supplementary notes, but is not limited thereto.

(Supplementary Note 1)

An information provision device including:

a detection means configured to acquire measurement data on a displacement amount of a building measured based on data observed by SAR, and detect a tilt due to unequal settling of the building based on the displacement amount of the building; and a display means configured to display a position of the building of which the tilt has been detected on map data.

(Supplementary Note 2)

The information provision device according to supplementary note 1, further including:

a measurement means configured to measure a displacement amount of the building based on the data observed by the SAR, in which the detection means acquires measurement data on the displacement amount of the building from the measurement means.

(Supplementary Note 3)

The information provision device according to supplementary note 2, in which the measurement means measures displacement amounts at two or more points of the building, and the detection means detects the tilt due to unequal settling of the building based on the displacement amounts at the two or more points of the building.

(Supplementary Note 4)

The information provision device according to any one of supplementary notes 1 to 3, in which the display means displays a symbol indicating the position of the tilted building.

(Supplementary Note 5)

The information provision device according to any one of supplementary notes 1 to 4, further including:

a classification means configured to classify the building depending on what tilt angle the building has.

(Supplementary Note 6)

The information provision device according to supplementary note 5, in which the display means displays an option button for selecting a condition regarding the classification of the building, and displays the position of the building having the tilt angle satisfying the selected condition together with the map data.

(Supplementary Note 7)

The information provision device according to supplementary note 5, in which the display means displays a symbol according to the classification of the building at the position of the building on the map data.

(Supplementary Note 8)

The information provision device according to any one of supplementary notes 1 to 7, in which the display means displays a symbol indicating the position of the building, the symbol being linked to the measurement data on the displacement amount of the building, together with the map data.

(Supplementary Note 9)

An information provision method including:

acquiring measurement data on a displacement amount of a building measured based on data observed by SAR, and detecting a tilt due to unequal settling of the building based on the displacement amount of the building; and displaying a position of the building of which the tilt has been detected on map data.

(Supplementary Note 10)

A non-transitory recording medium storing a program for causing a computer to execute:

acquiring measurement data on a displacement amount of a building measured based on data observed by SAR, and detecting a tilt due to unequal settling of the building based on the displacement amount of the building; and displaying a position of the building of which the tilt has been detected on map data.

(Supplementary Note 2)

An observation system including:

the information provision device according to any one of supplementary notes 1 to 8;

a database that stores the data observed by the SAR; and a display on which a symbol indicating the classification of the building, the symbol being linked to the measurement data on the displacement amount of the building, is displayed together with the map data.

While the invention has been particularly shown and described with reference to exemplary embodiments (examples) thereof, the invention is not limited to these embodiments (examples). It will be understood by those of ordinary skill in the art that various changes in form and details may be made therein without departing from the spirit and scope of the above-described exemplary embodiments (examples) as defined by the claims.

INDUSTRIAL APPLICABILITY

The present invention can be utilized, for example, to provide information needed by a construction company or a real estate company.

REFERENCE SIGNS LIST

1 Observation system
10 Information provision device
11 Measurement unit
12 Detection unit
13 Display unit
20 Information provision device
30 Information provision device
35 Classification unit
40 Information provision device
100 Geospatial information server (database)
200 Monitor (display)

What is claimed is:

1. An information provision device comprising:

a memory configured to store instructions; and at least one processor configured to execute the instructions to perform:

acquiring measurement data on a displacement amount of a building at two or more points measured based on data observed by SAR, and detecting a tilt due to unequal settling of the building based on a difference of the displacement amount between two points of the building; and displaying a position of the building in which the difference between the displacement amounts at the two points of the building is equal to or greater than a certain value in a range of 1/1000 to 6/1000 in a tilt angle on map data.

2. The information provision device according to claim 1, wherein:

the at least one processor is further configured to execute the instructions to perform:

measuring the displacement amount of the building based on the data observed by the SAR, and acquiring measurement data on the displacement amount of the building.

3. The information provision device according to claim 2, wherein the at least one processor is configured to execute the instructions to perform:

detecting the tilt due to unequal settling of the building based on the displacement amounts at the two or more points of the building.

4. The information provision device according to claim 1, wherein the at least one processor is configured to execute the instructions to perform:

displaying a symbol indicating the position of the tilted building.

5. The information provision device according to claim 1, wherein:

the at least one processor is configured to execute the instructions to perform:

classifying the building depending on what tilt angle the building has.

6. The information provision device according to claim 5, wherein the at least one processor is configured to execute the instructions to perform:

displaying an option button for selecting a condition regarding the classification of the building, and displaying the position of the building having the tilt angle satisfying the selected condition together with the map data.

7. The information provision device according to claim 5, wherein the at least one processor is configured to execute the instructions to perform:

displaying a symbol according to the classification of the building at the position of the building on the map data.

8. The information provision device according to claim 1, wherein the at least one processor is configured to execute the instructions to perform:

displaying a symbol indicating the position of the building, the symbol being linked to the measurement data on the displacement amount of the building, together with the map data.

9. An information provision method comprising:

acquiring measurement data on a displacement amount of a building at two or more points measured based on data observed by SAR, and detecting a tilt due to unequal settling of the building based on a difference of the displacement amount between two points of the building; and displaying a position of the building in which the difference between the displacement amounts at the two points of the building is equal to or greater than a certain value in a range of 1/1000 to 6/1000 in a tilt angle on map data.

10. A non-transitory recording medium storing a program for causing a computer to execute:

acquiring measurement data on a displacement amount of a building at two or more points measured based on data observed by SAR, and detecting a tilt due to unequal settling of the building based on a difference of the displacement amount between two points of the building; and displaying a position of the building in which the difference between the displacement amounts at the two points of the building is equal to or greater than a certain value in a range of 1/1000 to 6/1000 in a tilt angle on map data.

11. The information provision method according to claim 9, wherein the information provision method comprises:

measuring the displacement amount of the building based on the data observed by the SAR, and acquiring measurement data on the displacement amount of the building.

12. The information provision method according to claim 11, wherein the information provision method comprises:

detecting the tilt due to unequal settling of the building based on the displacement amounts at the two or more points of the building.

13. The information provision method according to claim 9, wherein the information provision method comprises:

displaying a symbol indicating the position of the tilted building.

14. The information provision method according to claim 9, wherein the information provision method further comprises:

classifying the building depending on what tilt angle the building has.

15. The information provision method according to claim 14, wherein the information provision method comprises:

displaying an option button for selecting a condition regarding the classification of the building, and displaying the position of the building having the tilt angle satisfying the selected condition together with the map data.

16. The non-transitory recording medium according to claim 10, wherein the program causes the computer to execute:

measuring the displacement amount of the building based on the data observed by the SAR, and acquiring measurement data on the displacement amount of the building.

17. The non-transitory recording medium according to claim 16, wherein the program causes the computer to execute:

detecting the tilt due to unequal settling of the building based on the displacement amounts at the two or more points of the building.

18. The non-transitory recording medium according to claim 10, wherein the program causes the computer to execute:

displaying a symbol indicating the position of the tilted building.

19. The non-transitory recording medium according to claim 10, wherein the program causes the computer to execute:

classifying the building depending on what tilt angle the building has.

20. The non-transitory recording medium according to claim 19, wherein the program causes the computer to execute:

displaying an option button for selecting a condition regarding the classification of the building, and displaying the position of the building having the tilt angle satisfying the selected condition together with the map data.

* * * * *